US009744671B2

(12) United States Patent
Connell, II et al.

(10) Patent No.: US 9,744,671 B2
(45) Date of Patent: *Aug. 29, 2017

(54) INFORMATION TECHNOLOGY ASSET TYPE IDENTIFICATION USING A MOBILE VISION-ENABLED ROBOT

(71) Applicant: International Business Machines Corporation, Armonk, NY (US)

(72) Inventors: Jonathan H. Connell, II, Cortlandt Manor, NY (US); Jeffrey O. Kephart, Cortlandt Manor, NY (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,168

(22) Filed: Mar. 18, 2016

(65) Prior Publication Data

US 2016/0203391 A1 Jul. 14, 2016

Related U.S. Application Data

(63) Continuation of application No. 14/282,531, filed on May 20, 2014, now Pat. No. 9,346,168.

(51) Int. Cl.
*G06K 9/62* (2006.01)
*G06F 17/30* (2006.01)
(Continued)

(52) U.S. Cl.
CPC .............. *B25J 9/1697* (2013.01); *B25J 9/16* (2013.01); *G06F 17/3028* (2013.01);
(Continued)

(58) Field of Classification Search
CPC ...................................................... B25J 9/1697
See application file for complete search history.

(56) References Cited

U.S. PATENT DOCUMENTS

| 7,091,882 B2 | 8/2006 | Doyle |
| 7,366,632 B2 | 4/2008 | Hamann et al. |

(Continued)

FOREIGN PATENT DOCUMENTS

WO    WO2009/020472 A1    2/2009

OTHER PUBLICATIONS

List of IBM Patents or Patent Applications Treated as Related (Appendix P), 2 pages.

(Continued)

*Primary Examiner* — David F Dunphy
(74) *Attorney, Agent, or Firm* — Stephen J. Walder, Jr.; Alexa L. Ashworth

(57) ABSTRACT

Mechanisms are provided for classifying an obstacle as an asset type. The mechanisms receive a digital image of an obstacle from an image capture device of an automated robot. The mechanisms perform a classification operation on the digital image of the obstacle to identify a proposed asset type classification for the obstacle. The mechanisms determine a final asset type for the obstacle based on the proposed asset type classification for the obstacle. The mechanisms update a map data structure for a physical premises in which the obstacle is present based on the final asset type.

20 Claims, 4 Drawing Sheets

(51) Int. Cl.
    H04N 5/225         (2006.01)
    B25J 9/16          (2006.01)
    G06K 9/00          (2006.01)
(52) U.S. Cl.
    CPC .. *G06F 17/30598* (2013.01); *G06F 17/30917* (2013.01); *G06K 9/00* (2013.01); *G06K 9/00664* (2013.01); *G06K 9/00671* (2013.01); *G06K 9/00805* (2013.01); *G06K 9/62* (2013.01); *G06K 9/6267* (2013.01); *H04N 5/2251* (2013.01); *G05B 2219/39369* (2013.01); *G05B 2219/40005* (2013.01)

(56) References Cited

U.S. PATENT DOCUMENTS

| | | | |
|---|---|---|---|
| 7,805,473 | B2 | 9/2010 | Ward |
| 2008/0162389 | A1* | 7/2008 | Aboutalib ............ G06K 9/6288 706/15 |
| 2012/0005220 | A1 | 1/2012 | Schindlauer et al. |
| 2013/0231779 | A1* | 9/2013 | Purkayastha .......... B25J 9/1697 700/259 |
| 2014/0270536 | A1* | 9/2014 | Amtrup .............. G06K 9/00483 382/195 |
| 2015/0269438 | A1* | 9/2015 | Samarasekera .... G06K 9/00637 382/154 |
| 2015/0336274 | A1 | 11/2015 | Connell, II et al. |

OTHER PUBLICATIONS

Calio, et. al., "Information Technology Asset Location Using Visual Detectors", filed Jan. 28, 2013, U.S. Appl. No. 13/751,269.

Connell II, et al., "Detecting Energy and Environmental Leaks in Indoor Environments Using a Mobile Robot", filed Sep. 28, 2010, U.S. Appl. No. 12/892,532.

Das, Rajarshi et al., "Automated Object Classification Using Temperature Profiles", filed May 18, 2012, U.S. Appl. No. 13/475,086.

Das, Rajarshi et al., "Location of Computing Assets within an Organization", filed Jul. 2, 2012, U.S. Appl. No. 13/540,122.

APGuo, et al., "Discovery and Monitoring of an Environment Using a Plurality of Robots", filed Jan. 12, 2012, U.S. Appl. No. 13/348,846.

Anonymous, "A Method for Determining the Likelihood a Derelict Asset Can Be Repurposed Into a Computing Environment", IP.com, IPCOM000218083D, May 18, 2012, 5 pages.

Anonymous, "Method to Validate Location of IT Assets in Configuration Management Database for Data Center Management", IP.com, IPCOM000214906D, Feb. 10, 2012, 3 pages.

Hamann, Hendrik F., "A measurement-based method for improving data center energy efficiency", 2008 IEEE International Conference on Sensor Networks, Ubiquitous, and Trustworthy Computing (SUTC '08), Jun. 11-13, 2008, pp. 312-313.

Hamann, Hendrik F.et al., "Methods and Technique for Measuring and Improving Data Center Best Practices", 11th Intersociety Conference on Thermal and Thermomechanical Phenomena in Electronic Systems (ITHERM 2008), May 28-31, 2008, pp. 1146-1152.

Hamann, Hendrik F. et al., "Rapid Three-Dimensional Thermal Characterization of Large-Scale Computing Facilities", IEEE Transactions on Components and Packaging Technologies, vol. 31, No. 2, Jun. 2008, pp. 444-448.

IBM Corporation, "Active acoustic location for data center asset management", IP.com, IPCOM000180105D, Mar. 4, 2009, 3 pages.

Lenchner, Jonathan et al., "Towards Data Center Self-Diagnosis Using a Mobile Robot", Proceedings of the 8th International Conference on Autonomic Computing (ICAC'11), Jun. 14-18, 2011, 10 pages.

Mansley, Chris et al., "Robotic Mapping and Monitoring of Data Centers", 2011 IEEE International Conference on Robotics and Automation (ICRA'11), Shanghai International Conference Center, May 9-13, 2011, pp. 5905-5910.

\* cited by examiner

INFORMATION TECHNOLOGY ASSET TYPE IDENTIFICATION USING A MOBILE VISION-ENABLED ROBOT

BACKGROUND

The present application relates generally to an improved data processing apparatus and method and more specifically to mechanisms for information technology asset type identification using a mobile, vision-enabled robot.

With the increasing miniaturization of information technology (IT) equipment, data centers and large organizations today contain more IT assets, storage systems, computing devices, communications equipment, and the like, than ever before. Large data centers, for example, may house hundreds of thousands of physical IT assets. A common problem in data centers and large organizations is keeping track of the exact locations of all of these IT assets.

One solution for keeping track of the location of IT assets in data centers and large organizations is to use passive or active radio frequency identifier (RFID) tags on the IT assets and then manually scan the RFID tags with RFID readers. However, with this solution, all IT assets need to have their own associated RFID tag and the tags must be manually read by a corresponding RFID reader. This leads to significant labor and material costs associated with these operations. In addition, manual scanning and tracking of IT assets is error-prone due to the influence of human error, and the location information gathered through manual means can frequently become out of date with respect to the actual current IT asset location.

SUMMARY

In one illustrative embodiment, a method is provided, utilizing a data processing system comprising a processor and a memory, for classifying an obstacle as a particular asset type. The method comprises receiving, by the data processing system, a digital image of an obstacle from an image capture device of an automated robot. The method further comprises performing, by the data processing system, a classification operation on the digital image of the obstacle to identify a proposed asset type classification for the obstacle. In addition, the method comprises determining, by the data processing system, a final asset type for the obstacle based on the proposed asset type classification for the obstacle. Moreover, the method comprises updating, by the data processing system, a map data structure for a physical premises in which the obstacle is present based on the final asset type.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
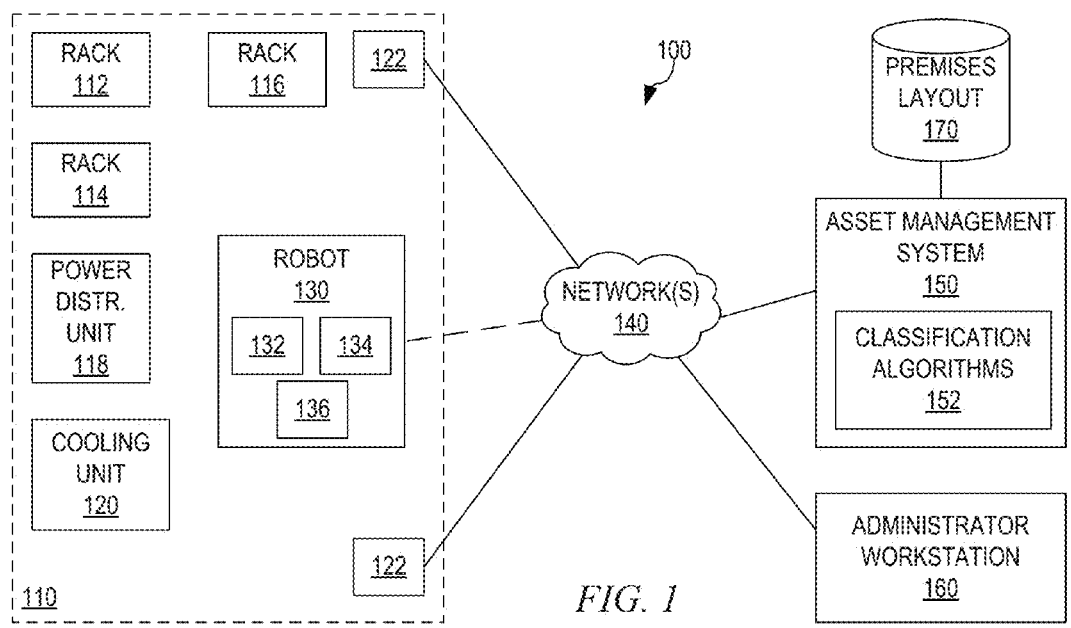
FIG. 1 is an example diagram of a distributed data processing system in which aspects of the illustrative embodiments may be implemented.

The illustrative embodiments provide mechanisms for locating assets, such as information technology (IT) assets or other types of assets, in the physical premises of an organization, such as a data center, office building, or other physical location having a plurality of assets deployed within the physical location. The illustrative embodiments solve issues regarding the automatic location of assets in physical premises, such as a data center, and populating a layout, blueprint, or map of the physical premises. Known mechanisms for generating a layout of physical premises require manual inspection and entry of information by human users which is very labor intensive and expensive, especially when the physical premises, e.g., data centers, are very large and contain a large number of assets. The mechanisms of the illustrative embodiments solve such issues by providing automated mechanisms for traversing the physical premises, capturing image data and other sensor data, and performing automated classification of assets into asset types which may then be augmented by human user interaction if necessary.

The mechanisms of the illustrative embodiments utilize one or more image capture devices mounted or integrated in a mobile machine, such as a mobile robot, as well as machine vision or image processing mechanisms and machine learning mechanisms for identifying the locations of assets and the classification of the assets into different types of assets. For example, a robot equipped with an image capture device, e.g., digital camera device, may capture images of obstacles encountered during the robot's movement through the physical premises. It should be appreciated that in the present description, it will be assumed for illustrative purposes that the mobile machine is a mobile robot and thus, objects encountered by the mobile robot will be referred to herein as "obstacles" since the robot must maneuver around them to complete the classification task for all assets. The use of the term "obstacles" does not mean that the robot, or mobile machine, must navigate around them but is merely an object whose presence is detected by the mobile machine during its operation an traversal of a physical premises.

The captured images may be analyzed using the machine vision or image processing mechanism to obtain information regarding the physical characteristics of the obstacle and machine learning mechanisms, which include trained classification algorithms, may be used that operate on the data of the capture images to identify a potential classification of the obstacle into a classification of an asset type. The location information for the obstacle may be obtained based on location information for the mobile robot and/or by using other location determination mechanisms generally known in the art.

The information identifying the potential classification of the asset type may be used to present to a human user a suggested classification of the obstacle as a particular type of asset within the physical premises. In such a case, the human user may look at the captured image and the suggested classification and either confirm, deny, or identify an alternative classification for the asset. These human confirmations, rejections and corrections may serve as additional training data for future automatic classifications, using classical methods of machine learning known in the art. Alternatively, or in addition, the information identifying the potential classification may be used to present a subset of finer grained classifications of asset types to the human user from which the human user may select an appropriate classification of asset type for the obstacle.

The classification of the obstacle into a particular classification of an asset may further be based on additional sensor information obtained from sensors provided on the robot or other sensors deployed in the physical premises. For example, temperature, humidity, infrared profile of the obstacle, proximity to other known types of assets, configuration of other known types of nearby assets relative to the obstacle, and other information indicative of the conditions within the vicinity of the encountered obstacle may be used during the classification operation to provide additional information upon which the classification can be performed. This additional information may be used to compare to patterns of similar information acquired through training of the classification algorithms from training sets of information, previous iterations of the classification algorithm with human user feedback to indicate the correctness/incorrectness of classifications of other types of assets, and the like. Through such comparisons of the conditions of the physical premises local to the detected obstacle, as well as the capturing of the image of the obstacle and analyzing the obstacle with regard to its physical characteristics and the physical characteristics of neighboring assets, as well as previously acquired map information for the physical premises, the classification algorithms may select a classification of asset type for the encountered obstacle.

It should be noted that the classification is performed using trained classification algorithms. The trained classification algorithms may be trained over multiple previous iterations of the operation in which human user feedback is provided to indicate correctness/incorrectness of the operation of the classification algorithms as well as providing input indicating the correct classification for the detected obstacle. Based on this training, a correlation of characteristics of obstacles, images, and the other physical premises information described above, is generated which can be used as a basis to perform future classifications of obstacles as particular asset types. For example, each trained classification algorithm may be trained to classify the obstacle with regard to a different characteristic of the obstacle. Such training can be continued while operating in a runtime environment such that based on results generated by the mechanisms of the illustrative embodiments, and user feedback received during runtime, the automated classification algorithms may be dynamically updated and trained so as to improve upon the initial training performed.

In some illustrative embodiments, to assist in the training of the classification algorithms, identifiers may be provided on the obstacles themselves to assist in the identification of the asset and correlation with an asset type. For example, RFID tags may be present on some or all of the assets in the physical premises and may be used to correlate other characteristics of the asset with a particular asset type. Moreover, during runtime operation, some or all of the assets of the physical premises may have associated RFID tags and these RFID tags may also be used to identify an obstacle as a particular asset and asset type. The same functionality can be achieved using other types of identifiers including barcodes, identification patterns such as QR codes and the like, etc.

The location information, classification information, characteristics of the local vicinity of the asset (or obstacle, where the term "obstacle" is used to refer to the asset prior to classification, at which time the robot merely knows that the object is an obstacle to its travel), and other gathered information regarding the particular asset may further be used to generate a map of the physical premises that may be stored for further use by the classification mechanisms of the illustrative embodiment and/or output to a user. In one illustrative embodiment, a user interface is provided for outputting a visual map of the physical premises in which filtering of the various types of assets is made possible so that different assets may be accentuated, removed, or otherwise identified in the output of the visual map of the physical premises.

One principle implementation of the illustrative embodiments is in the use of the mechanisms of the illustrative embodiments to locate assets within a data center. These assets may include racks, cooling units, such as Computer Room Air Conditioners (CRACs), computing terminals, power distribution units, or any other asset that may be present within a data center. More specifically, the mechanisms of the illustrative embodiments may utilize a mobile robot, equipped with one or more cameras, that traverses a data center and captures images of obstacles the robot encounters while moving through the physical premises of the data center. The captured images are correlated with location information of the robot and are further analyzed by the mechanisms of the illustrative embodiments to identify the types of assets at the various locations where the images were captured. In addition, other information about the conditions of the local vicinity in the physical premises around the encountered obstacle where the image is captured may be used to assist in the asset type classification. This information may be used together to identify the locations of particular types of assets within the data center and generate a map of the data center that is able to be manipulated by a user to obtain various levels of information regarding the various assets present in the data center.

As mentioned above, the mechanisms of the illustrative embodiments utilize a mobile machine to perform the image capturing. This mobile machine may be a vision-enabled robot that has the ability to propel and navigate itself through a physical location that includes obstacles. An example of such a vision-enabled robot with which the mechanisms of the illustrative embodiments may be utilized is described in "Robotic Mapping and Monitoring of Data Centers," Proceedings of the International Conference on Robotics and Automation (ICRA 2011), which is hereby incorporated by reference. The mechanisms of the illustrative embodiments directed to the analysis of the images captured by the robot as well as the classification of the obstacles into asset types may be provided in the robot itself or may be provided in a more centralized computing system. That is, in some illustrative embodiments the robot serves as the platform in which all of the functions of the illustrative embodiments are performed while in other illustrative embodiments the robot may serve as only a source of data, e.g., captured images and sensor data, that is then transmitted to a centralized computing system that performs the other operations of the illustrative embodiments.

It should be appreciated that while the illustrative embodiments will be described in terms of the location of IT assets within a data center using a vision-enabled robot, the present invention is not limited to such. Rather, the present invention is primarily directed to the classification of assets based on captured images and characteristic information regarding the physical premises in the local vicinity of the location where the image is captured, i.e. the local vicinity of the asset. As such, the illustrative embodiments may include implementations in any organization or in any physical premises (not only data centers) and may make use of any image capture devices, condition sensors or detectors, or the like capable of gathering image data for assets and characteristic information for the physical premises in the local vicinity of the asset. Such image capture devices, condition sensors or detectors, or the like, may be stationary, moveable by way of a manual process, or mobile, such as through automated mechanisms, e.g., robots or other automated devices.

For purposes of the Wowing description, it will be assumed for illustration only, that the visual detectors are digital cameras mounted on or integrated with automated robotic mechanisms, such as that described in the reference "Robotic Mapping and Monitoring of Data Centers" mentioned above, to provide a vision-enabled robot. Additional visual detectors may be used in addition to, or in lieu of, digital cameras. Such detectors may, for example, be based in infrared or laser imaging, including the use of infrared and laser imaging to obtain depth maps. It will further be assumed for illustration purposes, that the assets are assets within a data center organization and that the vision-enabled robot may perform some processing of captured images and provide the processed images to a centralized computing system for detailed analysis and classification of assets in accordance with the illustrative embodiments. However, as noted above, this is hut one embodiment and in other embodiments many, if not all, of the functions attributed to the centralized computing system may be performed in the vision-enabled robot itself and/or may be distributed across the vision-enabled robot, the centralized computing system, and/or other computing devices, depending upon the desired implementation.

Using the data center and a mobile vision-enabled robot as an example implementation of the illustrative embodiments of the present invention, the illustrative embodiments make use of the vision-enabled robot's ability to process images extremely accurately as well as process other sensor information from sensors provided on the vision-enabled robot, e.g., temperature sensors, humidity sensors, infrared detectors, location sensors, and the like, in order to capture images of obstacles encountered by the vision-enabled robot, sensor data indicating conditions in the physical premises local to the encountered obstacle, and provide this data back to the centralized computing system. The centralized computing system may implement a centralized asset management system which performs further analysis on the received information to perform classification of the obstacle into a corresponding asset type, either automatically or with cooperation from a human user, and maintain such asset location and type information up-to-date in a data structure representing a map of the data center.

With the automated vision-enabled robot implementation, a large monetary savings in labor and equipment costs can be realized while achieving a highly accurate and reliable up-to-date location and classification of physical assets within a physical premises, such as IT assets within a data center or other organization. During training, and/or during runtime in some implementations, a human user may be involved in the training of the classification mechanisms so as to ensure proper classification of assets by providing user feedback. However, when fully trained and operational, in some illustrative embodiments, no human labor is necessary on a day-to-day basis to manage the locations and classifications of these physical assets. Human technicians can add and remove assets, racks, cooling units, computing terminals, or the like, at will and, as long as the automated vision-enabled robot performs a scan of the physical assets on a routine basis, the current locations and classifications of these physical assets can be accurately maintained by the centralized asset management system with or without human user intervention. Even in the case where human user intervention is used, it is not necessary for the human user to be present in the data center to provide the feedback regarding the classification of the asset type and the human user is able to provide feedback from a more convenient location, such as the user's office, home, or anywhere that the user may be in communication with the centralized asset management system via a wired or wireless data communication link.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Thus, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram of a distributed data processing system in which aspects of the illustrative embodiments may be implemented. As shown in FIG. 1, the distributed data processing system 100 may be a distributed data processing system of an organization, such as a data center or the like, having a plurality of assets 112-120 physically located in a physical premises 110. The precise location and type of these assets 112-120 may not be known to administrators or other personnel associated with the organization due to repositioning of assets, upgrading or replacing assets, installation of new assets, and the like. These assets may have many different types including, but not limited to, power distribution units, cooling units, racks of computing devices, such as blade centers in blade center chassis, and the like. It should be appreciated that white particular types of assets, including racks, power distribution units, and cooling units, are shown in FIG. 1, the illustrative embodiments may be utilized to identify the location of any physical asset or computing system resource (IT asset) without departing from the spirit and scope of the illustrative embodiments.

An automated mobile machine, e.g., robot, 130 is provided in the physical premises 110. The automated robot 130 may be of a type such as described in "Robotic Mapping and Monitoring of Data Centers," Proceedings of the International Conference on Robotics and Automation (ICRA 2011), for example. Another type of automated robot 130 that may be used with the mechanisms of the illustrative embodiments is described in Lenchner et al., "Towards Data Center Self-Diagnosis using a Mobile Robot," International Conference on Autonomic Computing (ICAC) 2011, which is hereby incorporated by reference. Of course other types of automated robotic platforms may be utilized without departing from the spirit and scope of the illustrative embodiments.

The robot 130 is equipped with one or more cameras 132 or other machine-vision mechanisms, which are able to capture images of the local surroundings of the robot 130. The robot 130 may further be equipped with one or more sensors 134 for sensing various conditions of the local area around the robot 130. These sensors 134 may sense various types of conditions including the local temperature, local humidity, infrared profiles of assets within the local vicinity of the robot 130, and the like. It should be appreciated that the "local vicinity" is defined as the area around the robot 130 that is within the range of detection of the particular camera, sensor, or the like, such that a desired level of quality and accuracy of the operation of the camera, sensor, or the like, is achieved. Thus, the "local vicinity" is dependent upon the particular technology used to implement the camera, sensor, and the like.

The robot 130 further comprises location determination mechanisms 136 for locating the robot's position within the premises 110. The location determination mechanism 136 may take many different forms, including utilizing the robot's own odometry, a global positioning system, a cellular triangulation system, a location system that utilizes physical markers present within the premises 110, a location system that uses triangulation based on signals transmitted within the premises 110, or any combination of the above. Any type of location determination mechanism 136 generally known in the art or later developed is intended to be included within the spirit and scope of the present invention.

The robot 130 traverses one or more paths through the premises 110 and captures images of the various assets 112-120. In addition, if the robot 130 is equipped with one or more sensors 134, the sensors 134 may be used to capture sensor data corresponding to the captured image. Moreover, the location determination mechanism 136 determines the robot 130 location at the time of the capturing of the image and may further estimate or determine the location of the asset present in the captured image based on the location of the robot 130 in a manner generally known in the art, an example of which is described in the paper "Robotic Mapping and Monitoring of Data Centers," mentioned above. The information gathered by the robot 130 via its camera(s) 132, sensor(s) 134, and location determination mechanism 136, may be transmitted to an asset management system 150 via one or more data networks 140. In some illustrative embodiments, pre-processing of this data may be performed in the robot 130 itself to perform one or more of the operations described hereafter as being performed by the asset management system 150. For example, the automated robot 130 may perform an initial set of image/video analysis operations, filter operations, or the like to generate a digital image or set of digital images. Alternatively, the raw image data may be transmitted to the asset management system 150 which may be configured to include analysis engines, filter engines, and the like, for analyzing the raw image data to classify the asset.

In addition to, or instead of, the sensors 134 present on the robot 130, sensors 122 may be provided throughout the premises 110 to assist in identifying the conditions present in various areas of the premises. These sensors 134 may gather sensor data in a constant manner, periodic manner, or may do so in response to an event, such as a request to gather sensor data, and report this information back to an asset management system 150 via the one or more data networks 140. This information may be correlated by the asset management system 150 with data obtained from the robot 130 based on known locations of the sensors 122 and the location information obtained from the robot 130.

As mentioned above, the robot 130 and the sensors 122 may communicate with the asset management system 150 via one or more data networks 140. This communication with the one or more data networks 140 may be achieved through a wired or wireless communication link with the one or more data networks 140. The one or more data networks 140 may comprise one or more wireless communication networks through which data may be communicated between computing systems and/or one or more wired data communication networks. These networks may comprise one or more wired/wireless local area networks (LANs), one or more wired/wireless wide area networks (WANs), or the like.

The one or more data networks 140 communicatively couple the robot 130, sensors 122, asset management system 150, and administrator workstation 160, as well as other computing systems (not shown) of the distributed data processing system 100 to one another. The asset management system 150 is a computing system comprising hardware and software that is responsible for managing the various assets 112-120 of the distributed data processing system 100, e.g., the racks 112-116, power distribution unit 118, and cooling unit 120. As part of this management, the asset management system 150 may utilize the automated robot 130 to gather location information, characteristic information, and local vicinity condition information, for various assets 112-120 within the premises 110 using the camera 132, sensors 134 and/or 122, and location determination mechanism 136 of the automated robot 130.

In operation, the vision enabled automated robot 130 may move throughout the premises 110 performing various operations, such as temperature/humidity mapping using sensors 134, floor plan mapping using location determination mechanism 136, and the like. As the vision enabled automated robot 130 traverses the physical premises 110, the vision enabled automated robot 130 may encounter obstacles, i.e. assets 112-120 that are not identified. As a result, the automated robot 130 may capture an image of the obstacle using the camera 132, determine a location of the obstacle using the location determination mechanism 136, and obtain sensor data indicative of the temperature, humidity, infrared profile, or the like, of the local vicinity around the robot 130 at the time of the capture image using sensors 134 and/or 122. This gathered data is transmitted, via a wired or wireless communication connection (link), to the asset management system 150 via the one or more data networks 140.

In response to receiving the gathered data from the robot 130, and optionally the sensors 122 in the premises 110, the asset management system 150 initiates operations for classifying the obstacle into an appropriate asset type classification. The classification of the obstacle into an appropriate asset type classification is performed based on one or more trained classification algorithms 152 executed by the asset management system 150. The one or more trained classification algorithms 152 are applied to the data gathered from the robot 130 and the premises sensors 122 (if utilized), to classify the asset in the captured image into one of a plurality of pre-determined asset type classifications, e.g., a rack asset type, a power distribution unit asset type, a cooling unit asset type, or the like. Some classifications may have sub-classifications that identify the asset with more particularity as will be described in greater detail hereafter.

The classification algorithms 152 utilize pattern recognition of data and its correlation to an asset classification to identify an asset classification that most closely matches the current set of data acquired from the robot 130 and optionally the premises sensors 122. For example, the captured image obtained from the robot 130 may be analyzed, through machine vision analysis software executing on the asset management system 150, to obtain information related to the physical dimension of the obstacle encountered by the robot, its relative position to other assets in the local vicinity of the obstacle, and the like. Certain types of assets, like racks of servers, tend to be clustered together, while other types of assets, like air conditioning units, tend to be isolated from one another. Racks of servers, moreover, tend to have characteristic perforations to allow for the flow of air, and tend to be of darker colors. Such information may be used to perform an initial classification of the obstacle into a particular subset of the plurality of possible asset types, e.g., a power distribution unit will generally have a different set of physical dimensions from that of a rack of information technology (IT) equipment. General information about the layout of the premises 110 may be used in conjunction with the information gathered from analysis of the captured image to further refine the initial asset classification. That is, patterns of arrangement of assets may be generally applicable to the premises 110 and this information may be encoded in the classification algorithms 152, or learned by statistical analysis of previously encountered data centers, such that the identification of the obstacle's relative position to other assets in the captured image may be used to match to one of these patterns of arrangement of assets to obtain a clue as to the potential asset classification for the obstacle. For example, if it is known, possibly by statistical analysis, that racks are generally placed in rows with approximately 6 to 8 feet of clearance between the rows, and the captured image shows an obstacle to be at a position within 6 to 8 feet of an asset known to be a rack (such as from previous asset classifications or map data for the premises 110 already acquired), then it may be determined that there is a high likelihood that the obstacle is a rack. Similarly, if it is known that cooling units are typically positioned next to power distribution units, then this pattern of arrangement may be used to compare with the captured image to determine if this pattern of arrangement is matched by the captured image giving a greater likelihood that the obstacle is either a power distribution unit or a cooling unit.

The initial asset type classification based on the captured image may be further refined based on analysis of the sensor data obtained from the sensors 134 of the robot 130 and/or the premises sensors 122. That is, temperature data for the local vicinity of the obstacle, humidity data for the local vicinity of the obstacle, infrared profiles of the obstacle, and the like, may all be compared to learned patterns indicative of particular types of assets. Thus, the current sensor data may be compared to patterns of sensor data in order to provide additional clues as to the most likely classification of asset type for the obstacle.

For example, if the surface temperature of an obstacle (e.g., as determined by an infrared camera or infrared gun carried by the robot) is uniformly below that of the surrounding air, then it is likely that the obstacle is an air conditioning unit. On the other hand if the temperature on one side of a row of assets is uniformly lower than on the other side of the row of assets then it is highly probably that the row of assets are racks of servers.

Hence, through a combination of image analysis of captured images and analysis of sensor data obtained from sensors 134 on the robot 130 and/or sensors 122 deployed in the physical premises, an initial classification of the obstacle into a subset of asset types is made possible with subsequent refinement of the classification to a particular asset type, or finer grained smaller subset of asset types, within the subset of asset types is made possible. It should be appreciated that other information about known asset types, arrangement of assets within the physical premises 110, layout or map data already acquired for the premises 110, and the like, may be used to assist in the identification of an asset type classification for the obstacle. Thus, for example, the identification of other asset types for other assets in the premises 110 may be used to update the layout or map data structure 170 representing the premises 110 and the assets present within the premises as well as their characteristics (dimensions, spacing between assets, etc.) and characteristics of the various areas within the premises (temperature, humidity, etc.). This information stored in the layout or map data structure 170 may be used during asset classification operations to identify assets near the detected obstacle, use known arrangement patterns for assets within the premises 110, and the like, to give additional clues as to the most probable asset type for the detected obstacle.

In some illustrative embodiments, radio frequency identifier (RFID) tags, barcodes, QR codes, and the like may be associated with one or more of the assets 112-120 of the premises 110 and may be used to specifically identify the asset as a particular asset type. It should be noted, however, that not all assets 112-120 in the premises 110 may have such RFID tags, barcodes, QR codes, or other affixed identifiers associated with them and thus, cannot simply be identified by the robot 130 capturing an image and processing the image to identify such affixed identifiers. For those that do, the image analysis can be used to identify the affixed identifier and identify the particular asset type classification based on the identification of the particular affixed identifier of the obstacle. For other obstacles, the identification of other assets within the premises 110 based on the affixed identifiers may be used to update the layout or map data structure 170, which may then be used to assist in the identification of the obstacle that does not have such an affixed identifier such as described above. Such affixed identifiers may further be used during training of the classification algorithms as described hereafter.

As mentioned above, the mechanisms of the illustrative embodiments utilize trained classification algorithms 152 to perform the classification of an obstacle into an asset type classification. In the illustrative embodiments, the training of the classification algorithms 152 incorporates a machine learning approach in which the algorithms are trained based on a number of iterations of execution of the classification algorithms with user feedback indicating the correctness/incorrectness of the operation of the algorithm and potentially providing the correct result to the classification algorithm for use in refining the operation of the classification algorithm. In addition, affixed identifiers, such as RFID tags, barcodes, QR codes, and the like may be used to provide a means of positively identifying assets, and hence training of the classification algorithms, without direct human involvement.

For example, in order to train the classification algorithms 152 of the asset management system 150, the vision-enabled automated robot 130 is permitted to traverse a portion of the premises 130, encounter an obstacle, capture an image of the obstacle and sensor data using the camera 132 and sensors 134 and/or sensors 122, and provide the gathered data to the asset management system 150. The classification algorithm 152 performs a classification of the obstacle using the acquired data, asset arrangement information with which the classification algorithm is configured, any previous layout or map data 170, and the like, to generate a proposed classification of asset type for the obstacle. The proposed classification as well as the captured image is then sent by the asset management system 150 to a human user, such as via the one or more data networks 140 to administrator workstation 160, along with a request for the human user to indicate correctness/incorrectness and specify a correct asset classification for the obstacle.

Thus, for example, the asset management system 150 may determine a proposed asset type classification of "rack" and the human user, after viewing the captured image, may determine that the obstacle is actually a power distribution unit and thus, may enter an input indicating that the proposed asset type classification is incorrect and may then enter, or select from a listing, the correct asset type classification for the obstacle, i.e. "power distribution unit." This information may be returned to the asset management system 150 which would then update its classification algorithm data to reflect that the particular characteristics for the obstacle extracted from the captured image, the sensor data gathered for the local vicinity of the obstacle, and the like, are indicative of a "power distribution unit" rather than a "rack." This process is an iterative process where the classification algorithms learn over time to recognize different patterns of characteristics from the captured images, sensors, and the like, as being indicative of particular asset type classifications. Thus, via human user feedback, the classification algorithms are trained to recognized different types of assets and classify them into pre-defined asset type classifications.

As noted above, in one illustrative embodiment identifiers may be affixed to one or more of the assets in the premises 110 to identify them, provide their serial numbers, and no on. Among other things, such a tag identifies the asset as being of a particular type. These affixed identifiers, e.g., RFID tags, barcodes, QR codes, and the like, may be identified by the robot 130, such as by using a reader for the particular type of affixed identifier, or through image analysis of the affixed identifier as captured by the camera 132 of the robot 130. Once the asset tag is read and the asset associated with its particular type identified, the tagged item may be used as an additional training data point. The asset management system 150 may perform the above described asset classification operations using the classification algorithms 152 and may compare the resulting proposed classification of asset type with the actual asset type as determined from the identification of the asset type based on the affixed identifier. It should be appreciated that in this embodiment, little if any human user interaction is necessary to train the classification algorithms since feedback is automatically obtained by virtue of the reading of the affixed identifiers. In some embodiments, human user interaction similar to that described previously may further be requested even though affixed identifiers are utilized so as to have a second check as to what the correct asset type classification should be.

Thus, through an iterative machine learning process, the classification algorithms 152 of the asset management system 150 may be trained to recognize different asset types. The universe of possible asset types represent "buckets" into which obstacles are classified based on their characteristics and the characteristics of the local vicinity of the obstacle. This set of possible asset types is pre-defined, such as by a human user. Classifications may have sub-classifications, which in turn may have even further sub-classifications. Thus, for example, while a top level classification of asset type may be "rack," a sub-classification may specify a particular type of rack. This is helpful in implementations where multiple types of racks may be used within the premises 110, for example. The classification algorithms 152 may be trained to recognize obstacles whose characteristics and local vicinity characteristics are indicative of particular classifications and sub-classifications of asset type.

It should be noted that the training of the classification algorithms 152 presents an initial training of the classification algorithms that may be dynamically updated during runtime operation. That is, during runtime, once the asset management system 150 determines a proposed classification of asset type for an obstacle encountered by the robot 130, the proposed classification of asset type as well as the captured image may be presented to the human user 160 with a request to verily correctness/incorrectness of the proposed classification and provide a correct classification if the proposed classification is incorrect. In this way, the feedback returned by the human user may be used to continue to train the classification algorithms 152 during runtime in a dynamic manner. The same is true if, during runtime, identifiers are affixed to the obstacles encountered.

In some illustrative embodiments, human user interaction is only requested when a confidence in the classification of an obstacle into a particular asset type is less than a predetermined threshold. That is, based on the similarity of the characteristics of the obstacle as extracted from the captured image together with sensor values captured in the local vicinity of the obstacle, to the trained patterns of corresponding data used by the classification algorithms 152, a level of confidence may be calculated for the classification. This level of confidence may be compared to a predetermined threshold and if the level of confidence does not meet or exceed this predetermined threshold, the request may be sent to the human user at the administrator workstation 160 to request that the user indicate correctness/incorrectness of the classification and provide a correct classification if necessary. If the level of confidence meets or exceeds the predetermined threshold, then the request may not be sent to the human user and instead, the asset management system 150 may simply update its premises layout or map data structure 170 with the information about the newly encountered obstacle and its classification as a particular asset type.

The premises layout or map data structure 170 may be used as a basis for providing a user interface to the human user via the administrator workstation 160. That is, a graphical depiction of the premises 110 may be output on the administrator workstation 160 that illustrates the location and asset type of the various assets 112-120 in the premises 110. Various ways of rendering such an output may be utilized. In one illustrative embodiment, the graphical depiction is a map of the premises 110 in which different asset types are rendered in a different manner, e.g., different colors, different fill patterns, different symbols, different icons, etc. The user interface preferably includes the ability to allow a user to select different assets and/or asset types in the graphical depiction and drill down to obtain additional information about the particular asset or asset type, which may include the characteristics of the asset or asset type as obtained from the captured image, the captured image itself, the characteristics from the various sensors obtained during classification, and the like.

It should further be appreciated that the layout or map data structure 170 may also be used as input to other models of the premises 110 to facilitate other administrative operations for managing the premises 110 and/or the assets 112-120 within the premises 110. For example, such layout or map data may be useful for performing energy and power modeling of the premises 110 as well as performing asset tracking operations for the premises.

Thus, with the mechanisms of the illustrative embodiments, a robot 130 is utilized to acquire image data and sensor data from the premises 110 in association with an encountered obstacle and provide that information to an asset management system 150 which may then classify the encountered obstacle into a particular asset type classification based on this image and sensor data. A human user, via the user's workstation, may confirm or correct this classification and the asset management system 150 learns from this human user feedback to improve its classification of further obstacles encountered by the robot 130. It should be appreciated that this process significantly reduces the need for human intervention in the collection of data and classification of assets and thus, reduces the costs of performing such operations. Moreover, the human user, to the extent that the human user is involved in the process, is able to perform such human user intervention from a remote location from the premises 110 and does not need to be directly involved in the data collection operations being performed within the premises 110. In some cases, the human user is eliminated entirely from the classification when the confidence in the classification is high enough to warrant automatic classification without human user intervention.

Figure 2:
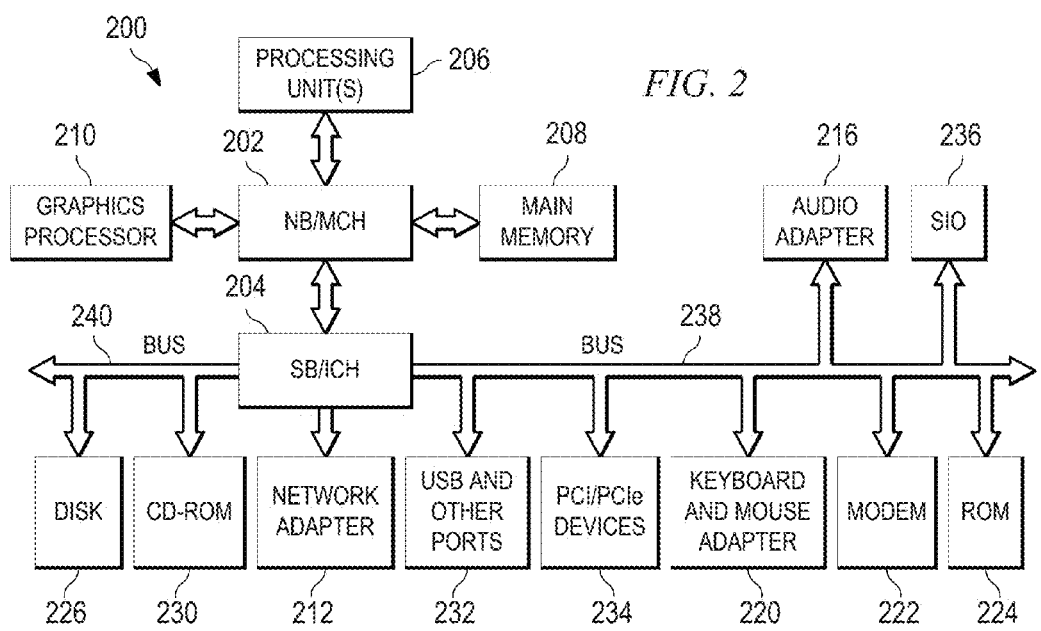
FIG. 2 is an example block diagram of a computing device in which aspects of the illustrative embodiments may be implemented.

FIG. 2 is a block diagram of an example data processing system in which aspects of the illustrative embodiments may be implemented. In particular, data processing system 200 is an example of a computing device that may be used to implement the asset management system 150 of FIG. 1, for example. In some illustrative embodiments, data processing system 200 may also, or alternatively, be provided in an automated robot to allow the automated robot to perform complex visual analysis and asset classification as described above and hereafter. The data processing system 200 may comprise computer usable code or instructions implementing the processes for illustrative embodiments of the present invention which may be executed by the data processing system 200 to perform the various operations described herein with regard to the asset management computing system 150.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
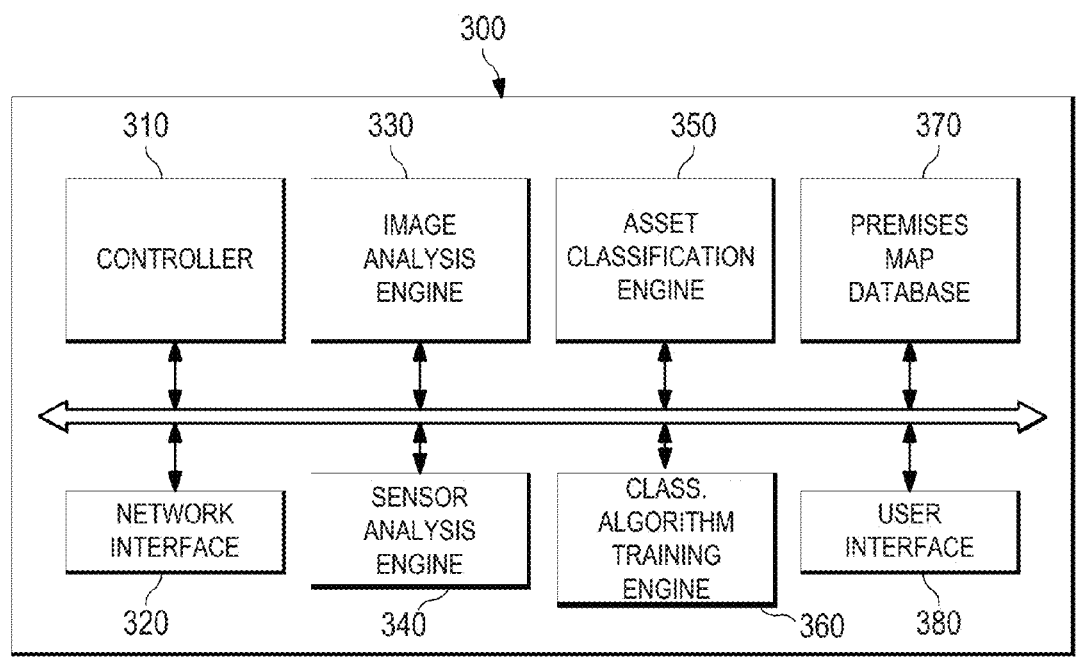
FIG. 3 is an example block diagram of an asset management system in accordance with one illustrative embodiment.

FIG. 3 is an example block diagram of an asset management system in accordance with one illustrative embodiment. The elements shown in FIG. 3 may be implemented in hardware, software, or any combination of hardware and software. In one illustrative embodiment, the elements of FIG. 3 are implemented as software instructions loaded into one or more memories and executed by one or more processors of the asset management system 300. The elements shown in FIG. 3 are only exemplary and other standard elements of a computing system, not specifically shown, may also be part of the asset management system without departing from the spirit and scope of the illustrative embodiments.

As shown in FIG. 3, the asset management system 300, which may be asset management system 150 in FIG. 1, for example, comprises a controller 310, a network interface 320, an image analysis engine 330, a sensor data analysis engine 340, an asset classification engine 350 comprising one or more classification algorithms, a classification algorithm training engine 360, a premises map database 370, and a user interface engine 380. The controller 310 controls the overall operation of the asset management system 300 and orchestrates the operation of the other elements 320-380. The network interface 320 provides a data communication pathway through which data may be received from the robot 130 and sensors 122 via network 140, requests and user interfaces may be presented to a user via the administrative workstation 160, and user input may be received from the administrator workstation 160. The network interface 320 may comprise wired, wireless, or a combination of wired and wireless communication interfaces for communicating with remotely located devices.

The image analysis engine 330 comprises logic for analyzing images captured by a camera or other visual detector/sensor of the robot 130, and received via the network interface 320, to determine one or more characteristics of assets present in the captured images, e.g., physical dimensions, spacing relative to other assets, location of the asset relative to fixed elements of the premises such as ceiling or floor tiles, doorways, fixtures on walls, etc., and the like. The received captured images may be raw captured image data or already filtered or pre-processed image data depending upon the particular selected embodiment. Such analysis may comprise feature detection within the captured images or any other generally known image analysis techniques capable of identifying characteristics of physical assets. In some embodiments, the image analysis engine 330 may perform pre-filtering of raw captured images received via the network interface 320 prior to performing image analysis on the filtered results. The results of the analysis performed by the analysis engine 330 may be presented to the asset classification engine 350 for use in performing classification of a physical asset into a corresponding asset type.

The sensor data analysis engine 340 analyzes the sensor data received via the network interface 320 from sensors 134 on the robot 130 or deployed in the premises 110, i.e. sensors 122, to determine conditions of the premises 110 in the local vicinity of the asset encountered by the robot 130. The analysis of the sensor data may involve taking raw sensor data and converting it or otherwise performing data manipulation to generate data useable for characterizing the physical conditions of the local vicinity of the asset. Such analysis may operate on temperature data, humidity data, infrared profile data for the asset, and the like. This information may likewise be provided to the asset classification engine 350 for use in classifying an asset into a corresponding asset type.

The asset classification engine 350 comprising one or more classification algorithms, operates on the captured image data and sensor data, as provided by the image analysis engine 330 and the sensor data analysis engine 340, to perform classification of the characteristics of the asset, and the local vicinity of the asset, to identify a proposed classification of the asset into a particular corresponding asset type. The asset classification engine 350 may further utilize arrangement pattern information and other information indicative of placement requirements of assets within the premises to assist in this classification. Moreover, the asset classification engine 350 may utilize information about already identified assets as stored in the premises map database 370 to assist with this classification. The asset classification engine 350 may use comparisons of characteristics with characteristics associated with particular asset types to determine a level of matching of the detected asset with the various asset types and select a classification of asset type from the levels of matching, e.g., a classification having a highest level of matching may be selected. The asset classification engine 350 may further calculate a confidence measure for the classification based on the level of matching and the particular types of characteristics contributing to the level of matching, e.g., different characteristics may be more heavily weighted than others during the calculation of the level of matching and/or the calculation of the confidence measure depending on the particular implementation. As noted above, this confidence measure may be used as a basis for determining whether human user intervention is to be sought or not for classifying an encountered obstacle into a particular asset type classification.

The classification algorithm training engine 360 is responsible for performing training of the classification algorithms of the asset classification engine 350. The training may be performed during a training phase for the asset classification engine 350 and/or during runtime to dynamically update the training of the asset classification engine 350. The training may involve issuing requests to a human user via a user's workstation and processing the user's input in response to such requests. The classification algorithm training engine 360 may send the proposed classification generated by the asset classification engine 350 and corresponding captured image to the human user and receive a feedback response indicating whether the proposed classification is correct or not and if not, a correct asset type classification for the asset. The training engine 360 may then update the classification algorithms with the characteristics of the asset so as to improve the operation of the classification algorithms and make it more likely that correct classification of similar assets in the future is performed.

The premises map database 370 stores information, e.g., location, characteristics, asset type classification, local vicinity condition information, and the like, about each of the physical assets present in the premises 110 that have been detected and classified. This premises map database 370 may be used by the asset classification engine 350 when performing asset type classification operations. In one illustrative embodiment the premises map database 370 may be used in conjunction with asset arrangement information with which the asset classification engine 350 is configured to identify the likelihood that a particular encountered obstacle is a particular type of asset based on the arrangement of other nearby assets.

The premises map database 370 may further be used to generate a user interface including a graphical depiction of the premises 100 with the detected asset locations and identifying the various asset types. The user interface may be generated by the user interface engine 380 and provided to a remotely located user workstation. The user interface preferably comprises functionality for allowing a user to manipulate the graphical depiction to emphasize certain types of assets, drill-down into particular assets or asset types to access more detailed characteristic information, and the like. The user interface may further map the local vicinity characteristic information to illustrate the conditions of the premises relative to the detected and classified assets, e.g., providing a temperature and/or humidity map in association with locations of assets.

The premises map database 370 may also be used as input to other models (not shown) for generating information and/or performing management operations for the premises 110 and the assets 112-120 provided therein. For example, energy and power models may utilize the premises map database 370 to generate such models and provide indications of energy and power utilization within the premises 110. In addition, management operations may be performed including issuing requests to reconfigure the assets within the physical premises 110, providing location information to technicians in combination with trouble tickets or requests for maintenance of particular assets, or the like. Other examples of such management operations may include hardware upgrades, hardware maintenance, troubleshooting, failure recovery, decommission of hardware, topology-dependent dynamic management techniques such as reallocating workloads across a data center for improving data center energy and thermal characteristics, or the like.

Figure 4:
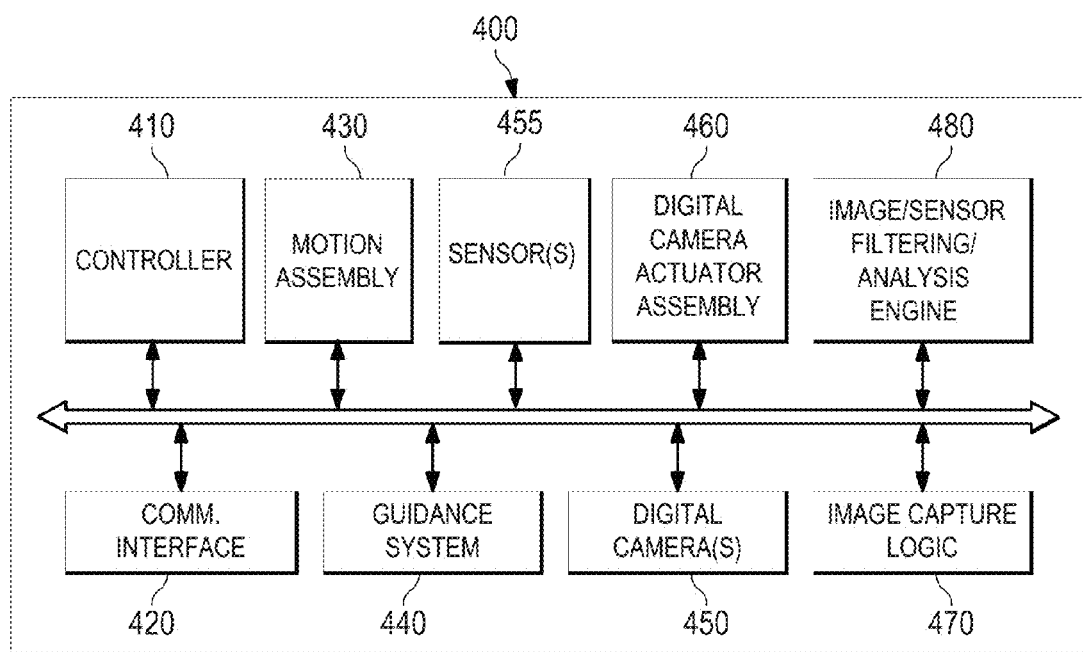
FIG. 4 is an example block diagram of a vision enabled automated robot in accordance with one illustrative embodiment.

FIG. 4 is an example block diagram of a vision enabled automated robot in accordance with one illustrative embodiment. Various ones of the elements shown in FIG. 4 may be implemented in hardware, software, or any combination of hardware and software. For example, the digital camera(s) 450, sensors 455, and actuator assembly 460 may be provide as hardware elements with circuitry and embedded software, such as in the form of firmware. Controller 410, wireless communication interface, guidance system 440, image capture logic 470, and image/sensor filtering/analysis logic 480 may be implemented as software instructions loaded into one or more memories, or stored as firmware, and executed by one or more processors. Other elements not explicitly shown in FIG. 4 may also be part of the vision enabled automated robot 400 without departing from the spirit and scope of the present invention.

As shown in FIG. 4, the vision enabled automated robot 400 comprises a controller 410, a wireless communication interface 420, a motion assembly 430, a guidance system 440, one or more digital cameras 450, one or more sensors 455, a digital camera actuator assembly 460, image capture logic 470, and image/sensor filtering/analysis logic 480. The controller 410 provides logic for controlling the overall operation of the vision enabled automated robot 400 and orchestrating the operation of the other depicted elements. Wireless communication interface 420 provides a wireless communication pathway through which data, commands, and instructions may be transmitted and received to/from remotely located devices via a wireless network. In one illustrative embodiment, wireless communication interface 420 may also comprise a short distance, or local, communication protocol interface, such as Bluetooth, infrared, or the like, through which communication may be made with physical assets directly by the vision enabled automated robot 400. This may be useful, for example, in embodiments where the asset management system utilizes the vision enable automated robot 400 as an interface between the asset management system and the physical assets themselves.

The motion assembly 430 is responsible for physically moving the robot 400 through the premises of the organization, e.g., premises 110. As such, the motion assembly 430 may comprise a motor, wheels or tracks, drive trains, or any other generally known elements for physically moving a robot through a physical area.

The guidance system 440 provides logic for determining the particular location of the robot 400 and identifying objects or obstacles in its surroundings. Thus, the guidance system 440 may make use of any known location determination mechanism, for example an odometry-based system, or a location triangulation system, like a Global Positioning System (GPS), though systems of these sorts which are more suited to indoor environments. Moreover, the guidance system 440 may comprise object/obstacle detection mechanisms for detecting objects/obstacles within the robot's surroundings for purposes of navigating around such objects/obstacles. With particular emphasis for the present illustrative embodiments, the guidance system 440 provides a location of the robot that may be communicated to an asset management system and used to identify the particular asset location as previously described above. Moreover, the obstacle detection instigates the robot 400 capturing an image of the obstacle for asset type classification in accordance with the mechanisms of the illustrative embodiments.

The one or more digital cameras 450 are used to capture images/video of physical assets for use in performing asset type classification and location in accordance with the illustrative embodiments as previously described. The one or more digital cameras 450 may be associated with an actuator assembly 460 for orienting the one or more digital cameras 450 so as to capture desired images/video of the physical assets. For example, in one illustrative embodiment, the digital camera 450 may be mounted on a vertical column, actuator arm, or the like, and the actuator assembly 460 may be used to move the digital camera 450 up and down the vertical column, or in three dimensions using the actuator arm, to position the digital camera 450 in front of the obstacle so as to capture images of the asset. In other illustrative embodiments, the one or more digital cameras 450 may be in a stationary position on the robot 400.

The one or more sensors 455 are used to collect data representative of detected conditions of the local vicinity of an asset. These sensors 455 may include temperature sensors, humidity sensors, infrared profile capturing sensors, and the like. This sensor data may be captured by the one or more sensors 455 and analyzed by the image/sensor filter/analysis logic 480 and/or sent to the remotely located asset management system.

The image capture logic 470 comprises logic for controlling the capturing of images/video for analysis. The image capture logic 470 may work in conjunction with the controller 410, the digital camera 450, the actuator assembly 460, and the like to position the digital camera 450 at an appropriate position for capturing a desired image and controlling these elements to perform the actual image capture operation.

The image/sensor filtering/analysis logic 480 comprises logic for filtering the captured images/video to focus analysis of the captured images/video on desired features of the physical assets. The image/sensor filtering/analysis logic 480 may further process the raw sensor data to generate processed sensor data for use in performing the asset type classification. In some illustrative embodiments, the image/sensor filtering/analysis logic 480 may be eliminated from the robot 400 entirely with such functionality being provided in the asset management system based on raw captured image/sensor data that is transmitted from the robot 400 to the asset management system.

Figure 5:
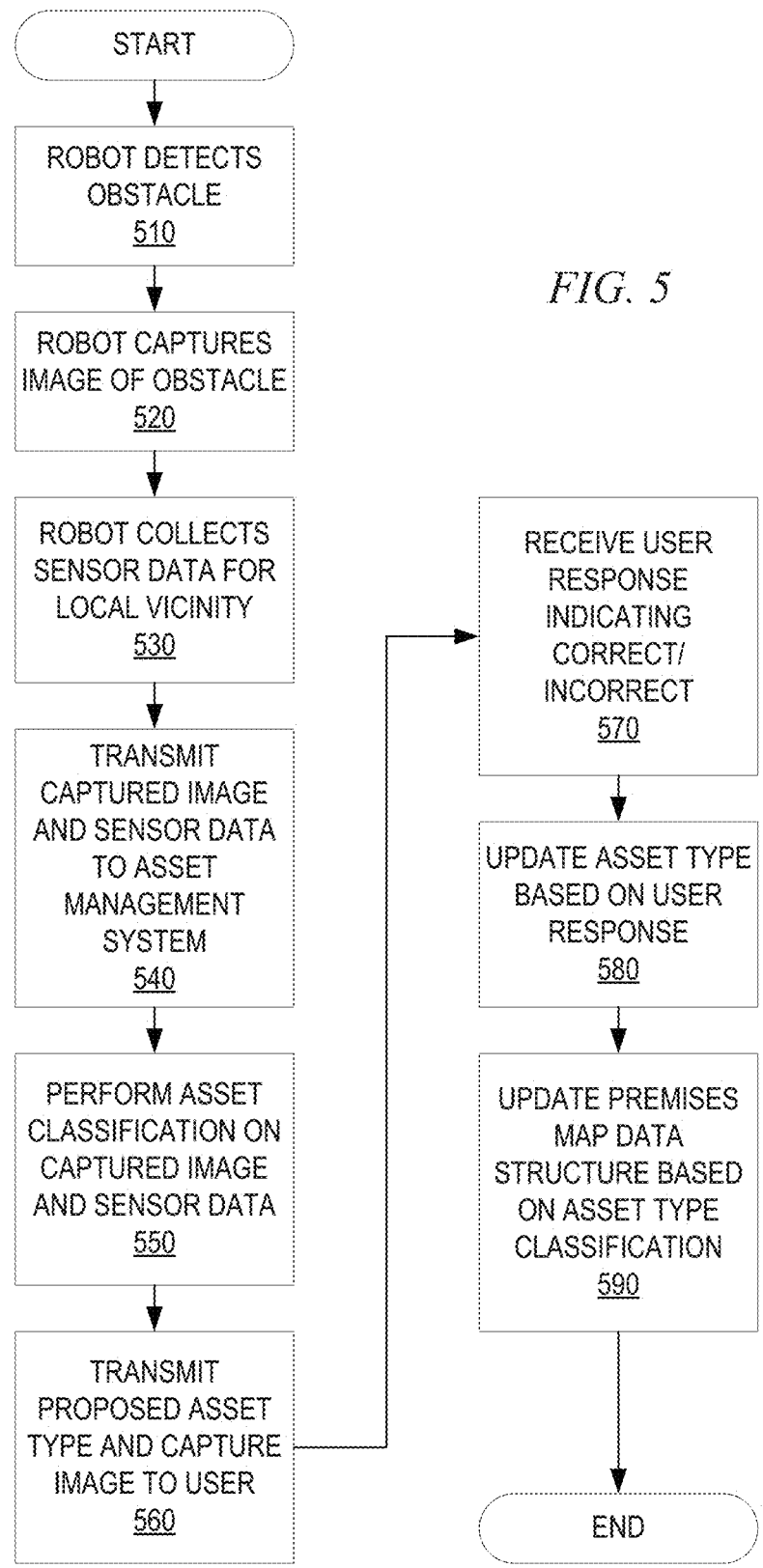
FIG. 5 is a flowchart outlining an example operation for performing asset classification in accordance with one illustrative embodiment.

FIG. 5 is a flowchart outlining an example operation for performing asset classification in accordance with one illustrative embodiment. As shown in FIG. 5, the operation starts with receiving an indication from a vision enabled automated robot that it has detected the presence of an obstacle at its current location (step 510). The robot captures an image of the obstacle (step 520) and collects sensor data for the local vicinity of the obstacle (step 530). The capture image data and sensor data are transmitted to an asset management system (step 540) which then performs asset classification operations on the received data to identify a proposed asset type classification for the obstacle (step 550). The proposed asset type classification is transmitted to a human user workstation along with the captured image and a request for the user to indicate whether the proposed asset type classification is correct or incorrect step 560). The human user responds to the request with an indication of correctness/incorrectness and optionally an indication of a correct asset type classification if the proposed asset type classification is incorrect (step 570). The asset type classification algorithms are then updated as necessary based on the human user's response (step 580). In addition, a premises map data structure representing the premises in which the obstacle is located is updated with the information about the obstacle (now a recognized asset) (step 590). The operation then terminates.

Thus, the mechanisms of the illustrative embodiments provide an automated way of identifying the location of physical assets as well as classifying the physical assets into various asset type classifications, such as racks, blade center chassis, power distribution units, cooling units, etc. The mechanisms of the illustrative embodiments may make use of automated robotic mechanisms already utilized in organizations to perform such automated identification of physical assets using new control and analysis mechanisms and methodologies. The illustrative embodiments thus allow an asset management system to automatically obtain and maintain detailed location information and asset type information for the physical assets of an organization for use in performing management operations.

Figure 6:
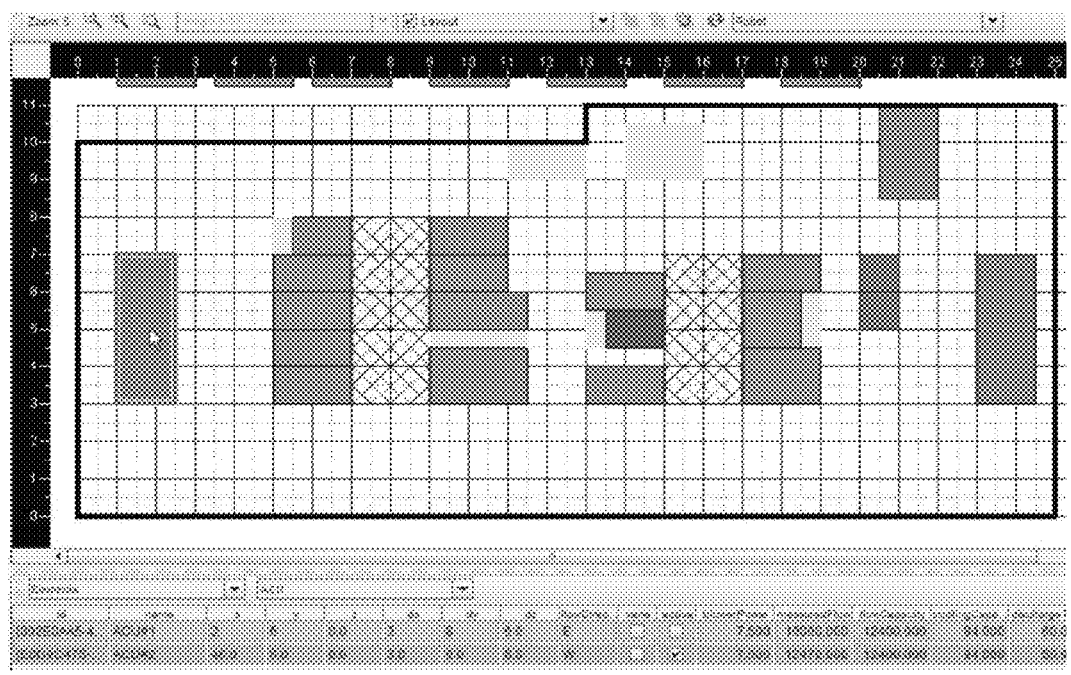
FIG. 6 is an example diagram of one example of a graphical representation of a premises map that may be output in accordance with one illustrative embodiment.

As noted above, one output that may be generated based on the results of the asset type classification mechanisms of the illustrative embodiments is a graphical depiction of the premises with the various assets and corresponding asset types identified. FIG. 6 is an example diagram of one example of a graphical representation of a premises map that may be output in accordance with one illustrative embodiment. As shown in FIG. 6, the premises map comprises boxes representing the location of various types of assets throughout the premises. The boxes are positioned on the map in accordance with the location information for the corresponding asset. The boxes are further shaded or colored to correspond to the asset type with which they are classified by the mechanisms of the illustrative embodiments. Other ways of conspicuously identifying different asset types may also be used without departing from the spirit and scope of the present invention. Preferably, the user interface through which the graphical depiction in FIG. 6 is provided further comprises user interface elements for allowing a user to select an individual asset or asset type, manipulate the graphical representation in various ways with regard to the selected asset or asset type, such as highlighting the selected asset or asset type, removing assets and asset types that do not correspond to the selected asset or asset type, or the like. Other user interface elements may be provided for drilling down into information associated with the selected asset or asset type to obtain characteristic information about the particular asset or asset type.

The above illustrative embodiments have been described in terms of automated robotic mechanisms that have vision enablement, such as via mounted or integrated digital cameras and associated pattern recognition software. However, it should be appreciated that similar abilities to identify the location of physical assets and classify the assets into asset types may be achieved using non-robotic and even non-automated mechanisms. That is, in other illustrative embodiments, portable digital camera devices or other portable visual detectors/sensors may be used without departing from the spirit and scope of the illustrative embodiments. For example, the mechanisms of the illustrative embodiments may utilize digital cameras integrated with hardware carried by human technicians or other authorized personnel, such as in mobile telephones, tablet computing devices, or other portable computing devices carried by such authorized personnel. As such, the robot referred to in the above illustrative embodiments may be replaced with a human operator and control signals may be transmitted to the portable equipment handled by the human operator with corresponding messages output to the human operator to assist in performance of the image capture and analysis of the illustrative embodiments.

In other illustrative embodiments, stationary cameras and visual detectors/sensors may be utilized to achieve the image capture of the illustrative embodiments. For example, security cameras or the like, which may be mounted to walls or physical structures of the organization's premises may be used to capture the images for use by the mechanisms of the illustrative embodiments. Any mechanism for capturing the images/videos that are analyzed in the manner previously described may be used without departing from the spirit and scope of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for classifying an obstacle as an asset type, comprising:
   receiving, by the data processing system, a digital image of an obstacle from an image capture device of an automated robot;
   performing, by the data processing system, a classification operation on the digital image of the obstacle to identify a proposed asset type classification for the obstacle;
   determining, by the data processing system, a final asset type for the obstacle based on the proposed asset type classification for the obstacle; and
   updating, by the data processing system, a map data structure for a physical premises in which the obstacle is present based on the final asset type, wherein performing the classification operation further comprises:
   gathering additional sensor information from one or more other sensors provided on either the robot or in the physical premises; and
   performing the classification operation based on a classification of characteristics of the obstacle obtained from analysis of the digital image and analysis of the additional sensor information, wherein the additional sensor information comprises information indicative of environmental conditions within a vicinity of the obstacle, that together with the digital image of the obstacle, are indicative of an asset type classification of the obstacle.

2. The method of claim 1, wherein determining a final asset type for the obstacle based on the proposed asset type classification for the obstacle comprises:
   calculating, by the data processing system, a confidence value indicating a confidence in the identification of the proposed asset type classification for the obstacle; and
   in response to the confidence value being less than a predetermined threshold value:
      presenting, by the data processing system, the proposed asset type classification and the digital image to a human user via a user interface output on a computing device associated with the human user, wherein the user interface identifies the proposed asset type classification, the digital image, and provides a mechanism for user feedback input indicating whether or not the proposed asset type classification is correct or incorrect; and
      determining, by the data processing system, the final asset type for the obstacle based on input from the human user via the user interface.

3. The method of claim 1, wherein the method is implemented automatically without human intervention.

4. The method of claim 1, wherein the additional sensor information comprises at least one of temperature information in proximity to the obstacle or humidity information in proximity to the obstacle, and at least one of infrared profile information of the obstacle, proximity information indicating a proximity of the obstacle to other known types of assets, or configuration information for other known types of nearby assets relative to the obstacle.

5. The method of claim 1, wherein performing the classification operation on the digital image of the obstacle comprises utilizing a plurality of classification algorithms that each classify the obstacle with regard to one or more different characteristics of the obstacle as identified in at least one of the digital image or the additional sensor information.

6. The method of claim 1, further comprising:
   outputting, by the data processing system, a user interface representing the map of the physical premises in which assets in the physical premises are distinguished by asset type.

7. The method of claim 6, wherein outputting the user interface representing the map of the physical premises comprises outputting the user interface with user interface elements for filtering assets in the physical premises to accentuate or remove assets from the map based on associated asset type.

8. The method of claim 1, wherein the physical premises is a data center and the obstacle is a physical asset of the data center.

9. The method of claim 1, wherein performing the classification operation further comprises:
   performing an initial asset classification operation based on analysis of the digital image to identify a subset of asset types in which the obstacle is classifiable; and
   performing a refined asset classification operation based on the additional sensor information, at least by comparing the additional sensor information to known patterns of additional sensor information for asset type classifications to identify a particular asset type classification within the subset of asset types.

10. The method of claim 1, further comprising:
    training the data processing system to perform the classification operation by performing iterative machine learning comprising:
       analyzing a digital image and additional sensor information associated with an obstacle present in a physical premises used for training to generate a proposed asset type classification of the obstacle;
       determining an actual asset type classification of the obstacle based on an asset identifier tag affixed to the obstacle;
       comparing the proposed asset type classification of the obstacle with the actual asset type classification of the obstacle; and
       modifying at least one parameter of the classification operation based on the results of comparing the proposed asset type classification of the obstacle with the actual asset type classification of the obstacle indicating a difference between the proposed asset type classification and the actual asset type classification.

11. A computer program product comprising a non-transitory computer readable medium having a computer readable program stored therein, wherein the computer readable program, when executed on a computing device, causes the computing device to:
    receive a digital image of an obstacle from an image capture device of an automated robot;
    perform a classification operation on the digital image of the obstacle to identify a proposed asset type classification for the obstacle;
    determine a final asset type for the obstacle based on the proposed asset type classification for the obstacle; and update a map data structure for a physical premises in which the obstacle is present based on the final asset type, wherein the computer readable program further causes the computing device to perform the classification operation at least by:
gathering additional sensor information from one or more other sensors provided on either the robot or in the physical premises; and
performing the classification operation based on a classification of characteristics of the obstacle obtained from analysis of the digital image and analysis of the additional sensor information, wherein the additional sensor information comprises information indicative of environmental conditions within a vicinity of the obstacle, that together with the digital image of the obstacle, are indicative of an asset type classification of the obstacle.

12. The computer program product of claim 11, wherein the computer readable program further causes the computing device to determine a final asset type for the obstacle based on the proposed asset type classification for the obstacle at least by:
calculating a confidence value indicating a confidence in the identification of the proposed asset type classification for the obstacle; and
in response to the confidence value being less than a predetermined threshold value:
presenting the proposed asset type classification and the digital image to a human user via a user interface output on a computing device associated with the human user, wherein the user interface identifies the proposed asset type classification, the digital image, and provides a mechanism for user feedback input indicating whether or not the proposed asset type classification is correct or incorrect; and
determining the final asset type for the obstacle based on input from the human user via the user interface.

13. The computer program product of claim 11, wherein the computer readable program further causes the computing device to execute the receive, perform, determine, and update operations automatically without human intervention.

14. The computer program product of claim 11, wherein the additional sensor information comprises at least one of temperature information in proximity to the obstacle or humidity information in proximity to the obstacle, and at least one of infrared profile information of the obstacle, proximity information indicating a proximity of the obstacle to other known types of assets, or configuration information for other known types of nearby assets relative to the obstacle.

15. The computer program product of claim 11, wherein the computer readable program further causes the computing device to perform the classification operation on the digital image of the obstacle at least by utilizing a plurality of classification algorithms that each classify the obstacle with regard to one or more different characteristics of the obstacle as identified in at least one of the digital image or the additional sensor information.

16. The computer program product of claim 11, wherein the computer readable program further causes the computing device to:
output a user interface representing the map of the physical premises in which assets in the physical premises are distinguished by asset type.

17. The computer program product of claim 16, wherein the computer readable program further causes the computing device to output the user interface representing the map of the physical premises at least by outputting the user interface with user interface elements for filtering assets in the physical premises to accentuate or remove assets from the map based on associated asset type.

18. The computer program product of claim 11, wherein the computer readable program further causes the computing device to perform the classification operation at least by:
performing an initial asset classification operation based on analysis of the digital image to identify a subset of asset types in which the obstacle is classifiable; and
performing a refined asset classification operation based on the additional sensor information, at least by comparing the additional sensor information to known patterns of additional sensor information for asset type classifications to identify a particular asset type classification within the subset of asset types.

19. The computer program product of claim 11, wherein the computer readable program further causes the computing device to:
train the data processing system to perform the classification operation by performing iterative machine learning comprising:
analyzing a digital image and additional sensor information associated with an obstacle present in a physical premises used for training to generate a proposed asset type classification of the obstacle;
determining an actual asset type classification of the obstacle based on an asset identifier tag affixed to the obstacle;
comparing the proposed asset type classification of the obstacle with the actual asset type classification of the obstacle; and
modifying at least one parameter of the classification operation based on the results of comparing the proposed asset type classification of the obstacle with the actual asset type classification of the obstacle indicating a difference between the proposed asset type classification and the actual asset type classification.

20. An apparatus comprising:
a processor; and
a memory coupled to the processor, wherein the memory comprises instructions which, when executed by the processor, cause the processor to:
receive a digital image of an obstacle from an image capture device of an automated robot;
perform a classification operation on the digital image of the obstacle to identify a proposed asset type classification for the obstacle;
determine a final asset type for the obstacle based on the proposed asset type classification for the obstacle; and
update a map data structure for a physical premises in which the obstacle is present based on the final asset type, wherein the instructions further cause the processor to perform the classification operation at least by:
gathering additional sensor information from one or more other sensors provided on either the robot or in the physical premises; and
performing the classification operation based on a classification of characteristics of the obstacle obtained from analysis of the digital image and analysis of the additional sensor information, wherein the additional sensor information comprises information indicative of environmental conditions within a vicinity of the obstacle, that together with the digital image of the obstacle, are indicative of an asset type classification of the obstacle.

* * * * *